(12) United States Patent
Merker et al.

(10) Patent No.: US 9,610,970 B2
(45) Date of Patent: Apr. 4, 2017

(54) STEERING GEAR MECHANISM

(71) Applicant: TRW Automotive GmbH, Alfdorf (DE)

(72) Inventors: Jörg Merker, Essen (DE); Christian Wutzler, Kaarst (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 0 days.

(21) Appl. No.: 14/295,369

(22) Filed: Jun. 4, 2014

(65) Prior Publication Data
US 2014/0360802 A1 Dec. 11, 2014

(30) Foreign Application Priority Data

Jun. 10, 2013 (DE) .......................... 10 2013 105 984

(51) Int. Cl.
*B62D 5/10* (2006.01)
*B62D 3/12* (2006.01)

(52) U.S. Cl.
CPC ...................................... *B62D 3/12* (2013.01)

(58) Field of Classification Search
CPC ...................................................... B62D 5/062
USPC ..................... 180/429, 427, 428; 280/93.514
See application file for complete search history.

(56) References Cited

U.S. PATENT DOCUMENTS

| 3,927,576 | A | * | 12/1975 | Colletti | ........................... 74/498 |
| 4,721,175 | A | * | 1/1988 | Butler | ........................... 180/428 |
| 6,932,356 | B2 | * | 8/2005 | Gloaguen | ..................... 277/636 |
| 2006/0185741 | A1 | * | 8/2006 | McKee | ........................ 137/587 |

FOREIGN PATENT DOCUMENTS

DE 102011107652 A1 10/1987
DE 102010021494 A1 12/2011

OTHER PUBLICATIONS

German Search Report for TRW Automotive GmbH Case No. 10 2013 105 984.8 dated Sep. 9, 2014.

* cited by examiner

*Primary Examiner* — Joseph Rocca
*Assistant Examiner* — Conan Duda
(74) *Attorney, Agent, or Firm* — MacMillan, Sobanski & Todd, LLC

(57) ABSTRACT

A steering gear mechanism has a steering housing and a steering input shaft. The steering housing is sealed and has a receptacle through which the steering input shaft passes into the steering housing. The receptacle is sealed against the steering input shaft. A first opening is provided on the steering input shaft within the steering housing, and a second opening is provided outside of the steering housing. The first and second openings are in fluid communication with each other.

15 Claims, 3 Drawing Sheets

STEERING GEAR MECHANISM

CROSS-REFERENCE TO RELATED APPLICATION

This application claims priority to German Patent Application No. 10 2013 105 984.8 filed Jun. 10, 2013, the disclosures of which are incorporated herein by reference in entirety.

BACKGROUND OF THE INVENTION

The invention relates to a steering gear mechanism for a vehicle.

Conventional steering gear mechanisms for vehicles comprise a steering housing and a steering input shaft. The steering housing is sealed and has a receptacle through which the steering input shaft passes into the steering housing. The receptacle is sealed against the steering input shaft.

The steering input shaft of the steering gear mechanism is used to transmit the steering movement of the steering wheel onto the steering linkage. On the steering linkage, for example a steering rack is provided that can be engaged by a gear connected to the steering input shaft. In order to protect the steering gear mechanism from external influences such as for example dirt or humidity, it is sealed. To this end, on the one hand the through-passage of the steering input shaft into the steering housing is sealed, but also the output side of the steering housing is sealed, for example by means of bellows which are fixed to the steering housing and to a gearing rack and which can yield in a flexible manner during a movement of the gearing rack in the longitudinal direction, so that a reliable seal of the steering housing is ensured even during a movement of the steering rack.

However, as a result of temperature fluctuations or other environmental effects, the pressure within the steering housing may rise or fall in relation to the ambient pressure. This pressure differential has an effect on the bellows. In the case of an elevated internal pressure, the bellows may get inflated; in the case of a lower internal pressure, the bellows may collapse or may rest against the gearing rack or against other components in the vicinity of the steering gear mechanism. In the case of a movement of the steering linkage, this may cause damage to the bellows and thus leaks in the steering housing.

Although various valves are known from the prior art, through which humidity may be discharged out of a steering housing, there may also be a certain amount of compensation of volume; however, the possibilities of achieving pressure compensation between the steering housing and the environment are insufficient so as to achieve pressure compensation also in the case of a negative pressure.

BRIEF SUMMARY OF THE INVENTION

It is a feature of the invention to provide a steering gear mechanism that allows a sufficient compensation of pressure to be achieved between the environment and the interior of the steering housing, without a reliable sealing of the steering housing against the ingress of dirt or humidity being negatively affected as a result.

In order to achieve this feature, the invention provides a steering housing and a steering input shaft. The steering housing is sealed and has a receptacle through which the steering input shaft passes into the steering housing. The receptacle is sealed against the steering input shaft. A first opening is provided on the steering input shaft within the steering housing, and a second opening is provided outside of the steering housing. The first and second openings are in fluid communication with each other. Solutions for ventilation or pressure compensation of the steering housing that have been known so far provide an opening or a valve directly on the steering housing. However, these solutions have the disadvantage that the valve will quickly get dirty, which can lead to a failure of the valve. By contrast, the solution according to the invention provides for pressure compensation to be achieved via a component that leads to an area of the vehicle that is protected against dirt, namely into the interior of the vehicle. As a result of the pressure compensation line being provided not directly on the housing but within the steering input shaft, the second opening will automatically be in an area of the vehicle that is protected from dirt or humidity. Thus, the risk of contamination of the pressure compensation opening is greatly reduced and proper functioning is ensured. The solution offers the additional advantage that no further output is required on the steering housing. This means that it is also possible to upgrade existing steering housings by installing a new steering input shaft.

The steering input shaft may preferably include a recess extending in the longitudinal direction, into which the openings terminate. The recess forms, together with the openings that terminate into the recesses, a type of pressure compensation channel that provides flow communication between the interior of the steering housing and the environment. As a result of the recess, the openings may be positioned at any location on the steering input shaft. The openings merely need to be in flow communication with the recess. The length of the recess may for example be selected such that the second opening is provided in an area that is protected from dirt and/or humidity.

The second opening provided outside of the steering housing may for example be provided on a front face of the steering input shaft that protrudes out of the steering housing. In the case of this design, no bore or recess is required for the opening in the lateral surface. The recess extending in the longitudinal direction extends in this embodiment substantially through the steering input shaft up to the opening in the front face. Moreover, a maximum distance between the steering housing and the second opening becomes possible in this way, so that the second opening may be positioned in a dry area of the vehicle, protected against dirt, for example in the interior of the vehicle.

The second opening of the lateral surface may for example be provided on the lateral surface of the steering input shaft and may extend substantially radially up to the recess. The steering input shaft normally includes a torsion rod for controlling a hydraulic power steering system. For this reason, the recess cannot completely extend through the entire steering input shaft. However, it is merely required for the first opening to be provided within the steering housing. The recess extending in the longitudinal direction only needs to extend through the steering input shaft to such a degree that flow communication with the interior is provided via the first opening. The communication between the recess and the first opening can be realised in a simple manner by providing the opening on the lateral surface, for example by way of a bore. In case the recess does not extend far enough into the interior of the steering housing, it is also possible for the second opening to extend at an angle from the recess to the lateral surface.

The second opening is preferably provided in a vehicle component that is protected from dirt and humidity. However, it is optionally also possible to provide, on the second opening, a water-tight, in particular breathable membrane that provides additional protection from dirt or humidity, but also allows an exchange of air between the interior and the environment.

The membrane may be held in a cap that is fastened on the second opening, for example to the front face of the steering input shaft.

On the receptacle, for example a circumferential seal as well as a bearing provided within the housing are provided for the steering input shaft, through which the steering input shaft is rotationally supported on the steering housing.

The first opening may for example be provided between the seal and the bearing, so that the first opening is located as close as possible to the steering housing wall and the pressure compensation channel formed by the openings and the recess is designed to be as short as possible.

Such a bearing may offer a minor amount of resistance against the exchange of air. This allows an improved exchange of air to be achieved between the interior and the environment, because the first opening is provided on that side of the bearing that faces away from the seal.

The positioning of the first opening is dependent on the design of the steering input shaft. The steering input shaft has for example a steering shaft with a receptacle for a torsion rod as well as a pinion that is supported on the steering shaft with limited rotatability and is coupled to the torsion rod. In the case of such a steering input shaft, the recess extends preferably up to the receptacle of the torsion rod, so that the recess extends into the interior as far as possible. The recess can for example extend from the front face provided outside of the steering housing substantially through the entire steering input shaft up to the receptacle for the torsion rod, so that a simple production of the recess becomes possible, for example by way of drilling. In such an embodiment, the steering shaft may also be formed by a tube.

Other advantages of this invention will become apparent to those skilled in the art from the following detailed description of the preferred embodiments, when read in light of the accompanying drawings.

DETAILED DESCRIPTION OF THE INVENTION

Figure 1:
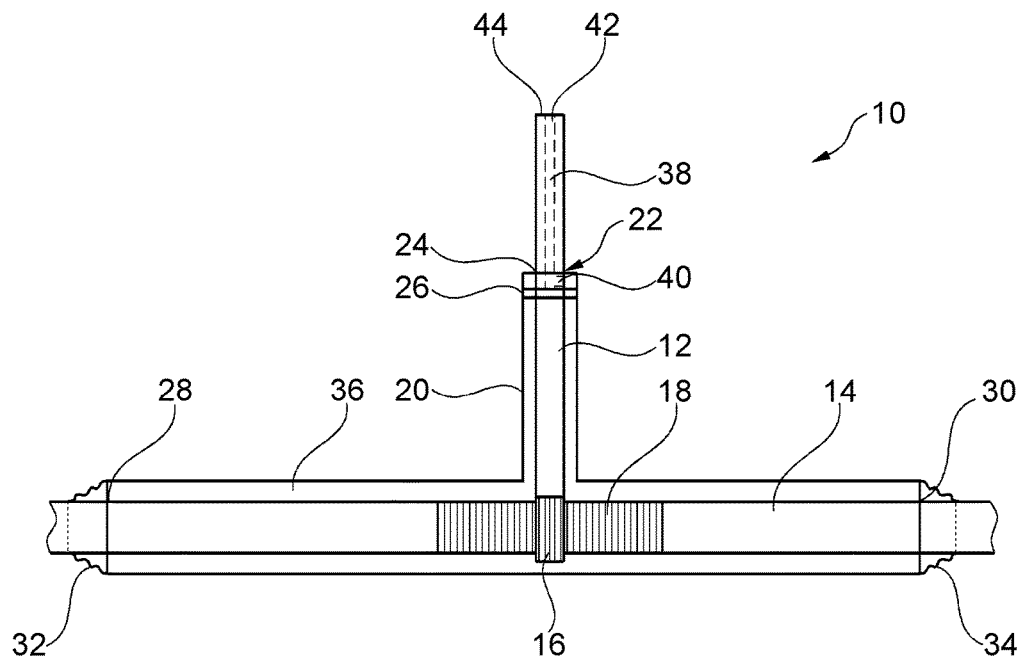
FIG. 1 shows a schematic view of a steering gear mechanism according to the invention.

FIG. 1 shows a schematic view of a steering gear mechanism 10 for a vehicle. The steering gear mechanism 10 includes a steering input shaft 12 that is coupled to the steering wheel of a vehicle, as well as a toothed rack 14 as the output element. The toothed rack 14 is provided with toothing 18 that engages in a pinion 16 that is coupled to the steering input shaft 12. Both the steering input shaft 12 and the toothed rack 14 are received in a common steering housing 20.

The steering housing 20 has a receptacle 22, through which the steering input shaft 12 is guided into the steering housing 20. On the receptacle 22, a seal 24 that seals the receptacle 22 against the steering input shaft 12 as well as a bearing 26 are provided, in which the steering input shaft 12 is rotatably supported.

The steering housing 20 further has two outputs 28, 30, through which the toothed rack 14 protrudes from the steering housing 20. The outputs 28, 30 are also sealed. In the embodiment shown here, the sealing is respectively achieved by means of bellows 32, 34 that are fixed to the toothed rack 14 and to the steering housing 20.

The steering housing 20 is completely sealed by the seal 24 or the bellows 32, 34, so that no dirt or humidity can get into the interior 36 of the steering housing 20.

For reasons of clarity, only the essential components of the steering gear 10 have been shown here. Usually, the steering housing 20 will have further openings which are also closed and/or sealed, for example using seals, sealing caps or closure caps. For example, a pressure piece bore may be provided on the steering housing 20. Usually, the steering input shaft is extended also in the axial direction beyond the pinion 16, is supported in the steering housing 20 via a radial bearing and is secured using a nut.

Figure 2:
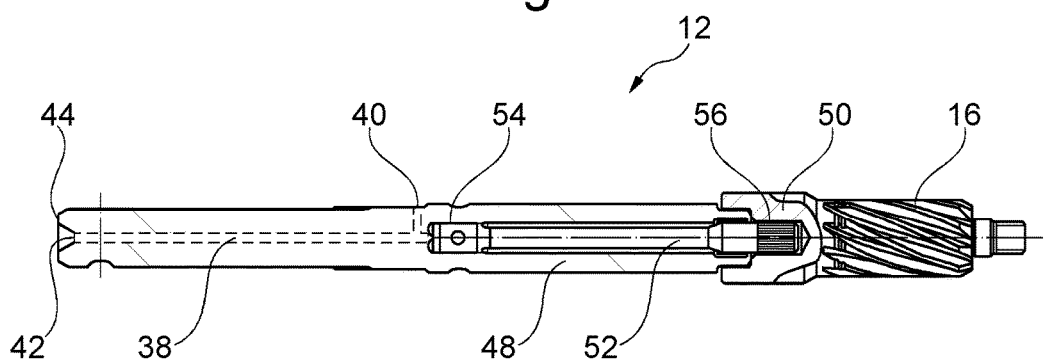
FIG. 2 shows the steering input shaft of the steering gear mechanism from FIG. 1 in a sectional view.

As can be seen in FIG. 2, the steering input shaft 12 is designed to have several pieces, namely a steering shaft 48 as well as a transmission element 50, on which the pinion 16 is provided that cooperates with the toothing 18 of the toothed rack 14. The steering shaft 48 and the transmission element 50 are coupled to each other with limited rotatability via a torsion rod 52. Both on the steering shaft 48 and on the transmission element 50, receptacles 54, 56 are respectively provided for the torsion rod 52. The control of a hydraulic power steering system is provided via the torsion of the torsion rod 52. The function of such a power steering system or of such a control is per se known and will not be explained in any more detail.

Further, the steering input shaft 12 has a recess 38 extending in the longitudinal direction, which opens in a first opening 40 provided within the steering housing 20 and a second opening 42 provided outside of the housing. This means that the openings 40, 42 are in flow communication with each other via the recess 38.

In the case of conventional steering housings, an overpressure or an underpressure relative to the ambient pressure in the interior 36 may develop as a result of temperature fluctuations or weather-related pressure fluctuations, which either leads to the bellows 32, 34 being inflated or, in the case of an underpressure, being pressed against the toothed rack 14 (S profile). In the case of a movement of the toothed rack 14, the bellows 32, 34 pressing against the toothed rack may get damaged.

A pressure compensation channel is formed through the openings 40, 42 and the recess 38 extending in the longitudinal direction, through which channel pressure compensation becomes possible in the case of a pressure differential between the interior 36 and the environment. It is therefore reliably prevented that any pressure differentials can act on the bellows 32, 34 or on other seals used for the outputs and the recess. In this way, any damage due to such a pressure differential or due to any deformation of the bellows 32, 34 or seals, which might be caused by such a pressure differential, is reliably prevented.

The second opening 42 is preferably provided in an area of the vehicle that is protected from dirt and humidity, so that there is no way that the interior of the steering housing 20 can be contaminated via the second opening 42. For example, the steering input shaft 12 may extend into the interior of the vehicle and the second opening 42 may be provided in the interior of the vehicle.

In the embodiment shown here, the second opening 42 is provided on the front face 44 of the steering input shaft 12, which protrudes out of the steering housing 20.

Figure 5:
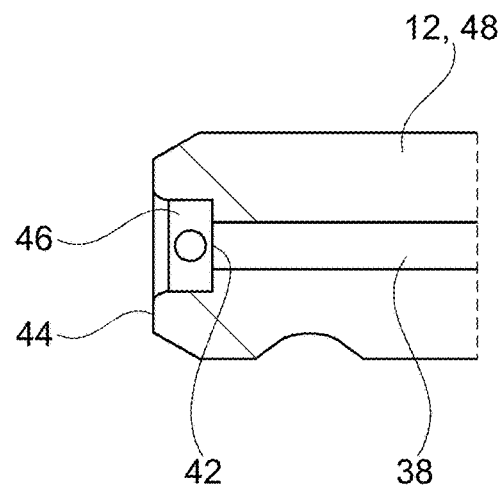
FIG. 5 shows a detailed view of the end of the steering input shaft from FIG. 2 on the side of the interior of the vehicle.

In order to additionally prevent the ingress of dirt or humidity, a membrane 46 is provided on the second opening 42, which is inserted into the front face 44 (FIG. 5) and can be fastened therein in an interlocking or adhesive manner.

This membrane is preferably water-tight and in particular breathable, so that an exchange of air between the interior 36 and the environment is possible, but any ingress of dirt or humidity is reliably prevented.

As can be seen in FIG. 2, the recess 38 substantially extends from the first front face 44 up to the receptacle 54 of the torsion rod 52. This means that the recess 38 forms, together within the reception space for the torsion rod 52, a through-channel through the entire steering shaft 48. This may be retrospectively introduced into the steering shaft 48, for example by drilling However, it is also conceivable that this is already introduced as early as during the manufacture of the steering shaft 48.

Also, the first opening 40 may be introduced by a machining or material-removing method such as drilling, water blasting, electrical discharge machining, laser cutting or punching, or as early as during the manufacture of the steering shaft 48.

Figure 3:
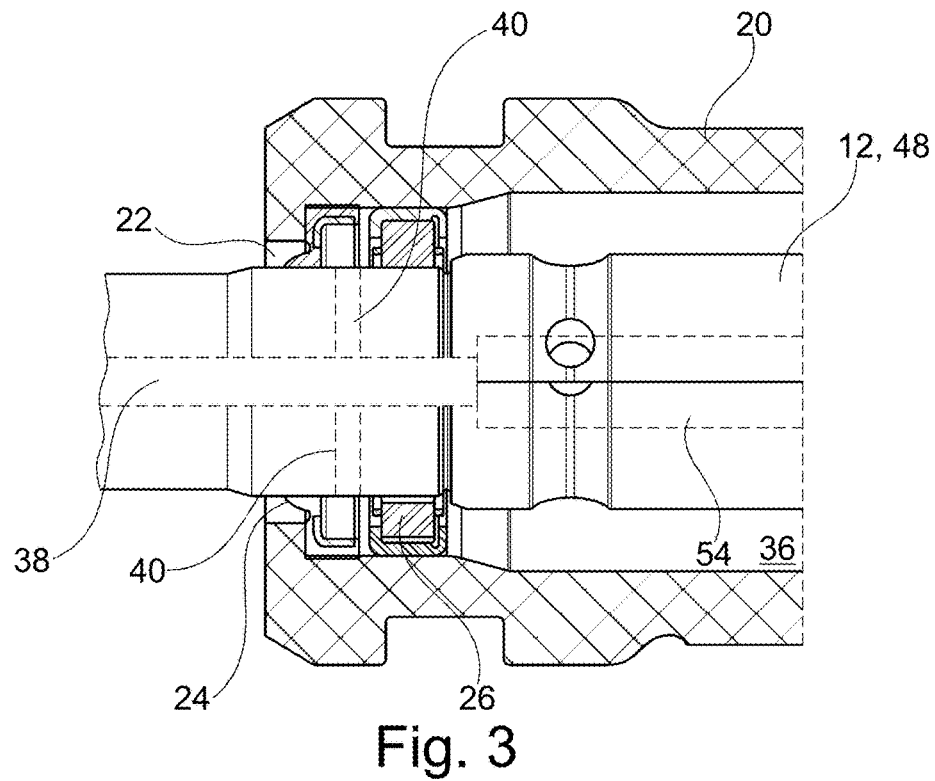
FIG. 3 shows a detailed view of the through-passage of the steering input shaft through the steering gear mechanism in the case of a steering gear mechanism according to a first embodiment of the invention.

As can be seen in FIG. 3, the first opening 40 substantially extends in the radial direction from the recess 38 on the lateral surface of the steering input shaft 12. The first opening 40 is provided on the receptacle 54 for the torsion rod, so that the recess 38 extends as far as possible into the interior 36 of the steering housing 20. In this embodiment, the first opening 40 is provided between the seal 24 and the bearing 26. This makes manufacturing simple because such a first opening 40 can be produced simply as a radial bore.

Figure 4:
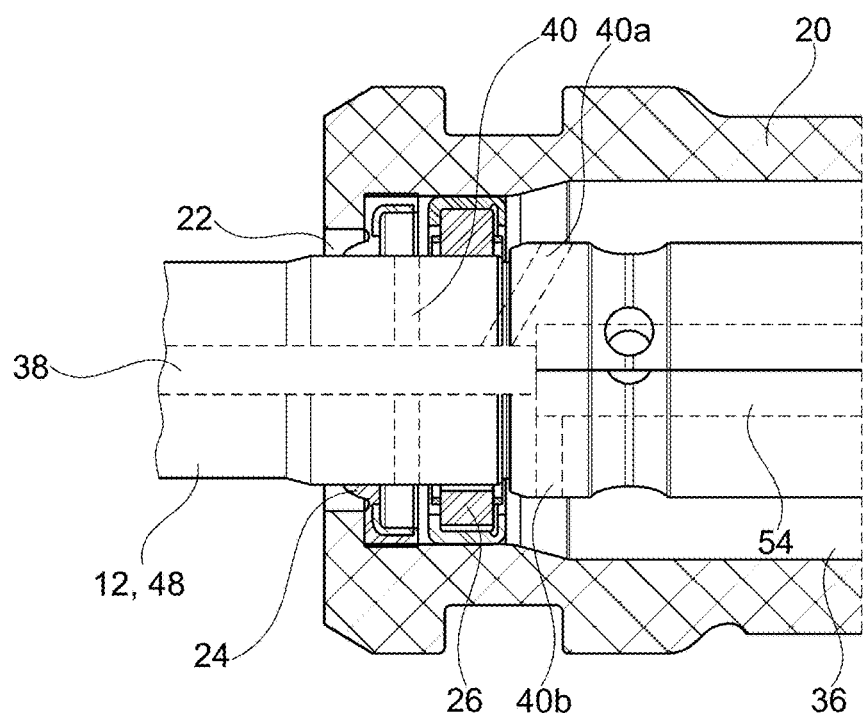
FIG. 4 shows a detailed view corresponding to FIG. 3 of a second embodiment of the steering gear mechanism.

Further embodiments of a first opening 40a, 40b are shown in FIG. 4. The opening 40a extends for example from the recess 38 at an angle in the direction towards the interior 36, and the first opening 40a is provided on that side of the bearing 26 that faces away from the seal 24.

The opening 40b is provided in the receptacle 54 for the torsion rod, and this location of the first opening 40b requires the torsion rod to be either pressed completely into the receptacle 54 or that channels are provided on the torsion rod 52 or on the receptacle 54, through which air can circulate between the first opening 40b and the second opening 42.

The bearing 26 may offer a certain amount of resistance against an exchange of air between the interior 36 and the environment. The first openings 40a, 40b offer the advantage that an improved exchange of air becomes possible between the interior 36 and the environment.

Irrespective of the embodiment it has to be ensured that the first opening 40, 40a, 40b is provided within the steering housing 20, i.e. opens into the interior 36, and that the second opening 42 is provided outside of the steering housing 20, so that an exchange of air between the interior 36 and the environment is possible. This means that the second opening 42 may also be provided on the lateral surface of the steering input shaft. It merely needs to be ensured that no dirt or humidity can get into the recess 38 and thus into the interior 36 through the second opening 42.

Figure 6:
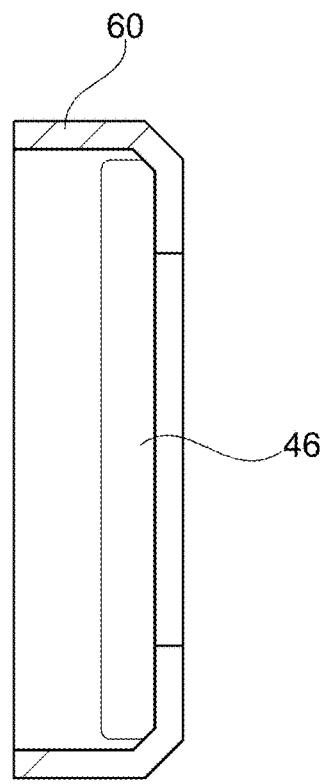
FIG. 6 shows a sealing cap for the steering shaft from FIG. 2.

The membrane 46 may also be provided on a separate cap 60 that is attached to the front face 44 (FIG. 6).

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A steering gear mechanism for a vehicle comprising:
   a steering housing and a steering input shaft, wherein said steering housing is sealed and has a receptacle through which said steering input shaft is passed into said steering housing, wherein said receptacle is sealed against said steering input shaft, wherein on said steering input shaft, a first opening is provided within said steering housing and a second opening is provided outside of said steering housing, wherein said first opening and said second opening are in flow communication with each other, wherein said second opening is an axial opening provided on a front face of an axial terminal end of said steering input shaft, said front face being outside of said steering housing, wherein a water-tight, breathable membrane is provided on said second opening, and wherein a cap is provided on said front face, said membrane being held within said cap.

2. The steering gear mechanism of claim 1 wherein said steering input shaft includes a recess extending in a longitudinal direction of said steering input shaft, said first and second openings terminating into said recess.

3. The steering gear mechanism of claim 2 wherein said first opening is provided on a lateral surface of said steering input shaft and extends substantially radially up to said recess.

4. The steering gear mechanism of claim 1 wherein said receptacle is being provided with a circumferential seal and a bearing for said steering input shaft, said bearing being arranged within said steering housing.

5. The steering gear mechanism of claim 4 wherein said first opening is provided between said seal and said bearing.

6. The steering gear mechanism of claim 4 wherein said first opening is provided on a side of said bearing which faces away from said seal.

7. The steering gear mechanism of claim 1 wherein said steering input shaft has a steering shaft with a receptacle for a torsion rod as well as a pinion, said pinion being supported on said steering shaft with limited rotatability and being coupled to said torsion rod, said recess extending up to said receptacle of said torsion rod.

8. A steering gear mechanism for a vehicle comprising:
   a steering housing and a steering input shaft, wherein said steering housing is sealed and has a receptacle through which said steering input shaft is passed into said steering housing, wherein said receptacle is sealed against said steering input shaft, wherein on said steering input shaft, a first opening is provided within said steering housing and a second opening is provided outside of said steering housing, wherein said first opening and said second opening are in flow communication with each other, wherein said receptacle is being provided with a circumferential seal and a bearing for said steering input shaft, said bearing being arranged within said steering housing at an open end of said receptacle through which said steering input shaft is inserted into said steering housing, and wherein said first opening is provided only between said seal and said bearing.

9. The steering gear mechanism of claim 8 wherein said steering input shaft includes a recess extending in a longitudinal direction of said steering input shaft, said first and second openings terminating into said recess.

10. The steering gear mechanism of claim 9 wherein said first opening is provided on a lateral surface of said steering input shaft and extends substantially radially up to said recess.

11. The steering gear mechanism of claim 8 wherein said second opening is provided on a front face of said steering input shaft, said front face being outside of said steering housing.

12. The steering gear mechanism of claim 11 wherein a water-tight, breathable membrane is provided on said second opening.

13. The steering gear mechanism of claim 12 wherein a cap is provided on said front face, said membrane being held within said cap.

14. The steering gear mechanism of claim 8 wherein said first opening is provided on a side of said bearing which faces away from said seal.

15. The steering gear mechanism of claim 8 wherein said steering input shaft has a steering shaft with a receptacle for a torsion rod as well as a pinion, said pinion being supported on said steering shaft with limited rotatability and being coupled to said torsion rod, said recess extending up to said receptacle of said torsion rod.

* * * * *